United States Patent
Fischer et al.

[11] Patent Number: 6,131,174
[45] Date of Patent: Oct. 10, 2000

[54] SYSTEM AND METHOD FOR TESTING OF EMBEDDED PROCESSOR

[75] Inventors: Frederick Harrison Fischer, Macungie; Vladimir Sindalovsky, Perkasie, both of Pa.

[73] Assignee: Lucent Technologies Inc., Murray Hill, N.J.

[21] Appl. No.: 09/140,564

[22] Filed: Aug. 27, 1998

[51] Int. Cl.[7] ............................ G01R 31/28
[52] U.S. Cl. .............................. 714/733
[58] Field of Search .................. 714/733, 47, 706

[56] References Cited

U.S. PATENT DOCUMENTS

| | | | |
|---|---|---|---|
| 5,157,664 | 10/1992 | Waite | 714/710 |
| 5,406,554 | 4/1995 | Parry | 370/381 |
| 5,909,544 | 6/1999 | Anderson, II et al. | 395/712 |

*Primary Examiner*—Phung M. Chung
*Attorney, Agent, or Firm*—Brown Raysman Millstein Felder & Steiner LLP

[57] ABSTRACT

An interlocutor system and method is described that allows for at-speed testing of an embedded microcontroller at the control of an embedded digital signal processor in a system-on-a-chip architecture. The interlocutor system includes a buffer for temporarily storing test program data words output by the DSP and retrieved by the microcontroller being tested and a control circuit for controlling the microcontroller and DSP. The microcontroller, DSP, and interlocutor system are all located on a single integrated circuit.

24 Claims, 4 Drawing Sheets

SYSTEM AND METHOD FOR TESTING OF EMBEDDED PROCESSOR

BACKGROUND OF THE INVENTION

The present invention relates to integrated circuits having two or more embedded processor cores, and more particularly to an interlocutor system and method for allowing one embedded processor core to control operation of a second embedded processor core during at-speed testing of the second core.

An increasing number of systems-on-a-chip are in use having at least two embedded processor cores which share the same external memory interface. These cores commonly include a microcontroller and digital signal processor (DSP) or two DSP cores requesting access to external memory for an instruction or data read/write. The cores may also include microprocessors or other processing devices.

An exemplary system-on-a-chip architecture is illustrated in FIG. 1. As shown in FIG. 1. a single integrated circuit 10 includes a microprocessor 12, DSP 14, and an arbiter 16, and is connected to an external memory device 8. The arbiter 16 determines when access is granted for the microprocessor 12 or DSP 14 to the external memory 8. The microprocessor 12 and DSP 14 send request signals to the arbiter 16 when they need to interface with the external memory 8, and the arbiter 16 sends signals acknowledging these requests.

Outputs from the microprocessor 12 and DSP 14, which includes data signals and address and control signals, are coupled to external memory interface multiplexers 20, which are controlled by a processor selection signal from the arbiter 16. The arbiter 16 determines which processor output is transmitted to the external memory 8 through an output buffer gate or amplifier 22 selectively enabled with an output enable signal. Data retrieved from the external memory 8 is shunted to both processors 12, 14 through an input buffer gate or amplifier 24 for use by one of the processors depending upon the address data.

When being tested, both processor cores 12, 14 need to access instructions and data from the external memory interface, if no on-chip memory exists. Tester loads are usually much greater than the loads normally driven by a chip in application boards. The external memory interface in a testing environment is thus overloaded by a tester, as comparing to the normal on-board applications. As a result, testing cannot be run at the same speed as in applications. Indeed, known testing techniques of embedded microcontrollers employ reduced operating frequencies in order to allow sufficient time for the microcontroller to drive the associated tester loads.

If one of the cores has access to on-chip memory, this memory can be downloaded prior to testing, and test for this core can be performed at speed with subsequent upload of the results from on-chip memory to a tester. If the second core is not associated with on-chip memory, however, its testing still has to be performed at a lower speed or with a greater number of wait states from external memory than normally used in applications.

There is thus a need for a system which allows for at-speed testing of an embedded processor core on a system-on-a-chip.

SUMMARY OF THE INVENTION

The problems described above are solved by, in preferred embodiments, an interlocutor system and method that allows for at-speed testing of an embedded microcontroller at the control of an embedded digital signal processor in a system-on-a-chip architecture. The interlocutor system includes a buffer for temporarily storing test program data words output by the DSP and retrieved by the microcontroller being tested and a control circuit for controlling the microcontroller and DSP. The microcontroller, DSP, and interlocutor system are all located on a single integrated circuit.

In preferred embodiments, the integrated circuit further includes an on-chip memory device such as a RAM coupled to the DSP. A test program is downloaded into the on-chip memory along with a DSP support program. The DSP reads the appropriate location from the on-chip RAM and then performs a dummy write of one or more test program data words into the external, off-chip memory. When the system is in test mode, the dummy write is intercepted by the buffer, which can be composed of a one byte, one 16 bit word or deeper register, the latter preferably organized as a FIFO. The data words stored in the buffer are made available for the microcontroller to fetch. Any write to the external memory by the microcontroller, usually consisting of the results of processing the test program, is redirected to the DSP to be self checked.

In preferred embodiments, the control circuit comprises a counter which is incremented when a data word is latched into the buffer and decremented when a data word is retrieved from the buffer by the microcontroller. The counter is initialized to zero so that when the buffer is empty, the counter is empty. When the counter is empty, the microcontroller clock is disabled so the microcontroller is prevented from attempting to retrieve any data from the buffer. Depending upon the depth of the buffer, the value in the counter can be used to determine whether the buffer is full or not. When the buffer is less than full, the DSP is enabled to latch another test program data word into the buffer. When the buffer is full, the DSP is instructed to wait until the microcontroller retrieves a data word from the buffer before outputting another data word.

The present invention provides for download—self-check—upload type of testing, even though the tested core is not directly associated with on-chip memory. That is, a test program may be downloaded to the on-chip memory, the DSP can check the results of the microcontroller's performance of the test program, and the DSP can upload the test results This type of testing provides a number of advantages, including (1) the ability to achieve a higher testing speed and even at-speed testing using slow testers, because the tester is not directly involved during self-check; (2) the ability to perform simultaneous group testing of a number of chips, in which each chip in the group, acting in parallel, downloads the test program, performs a self-check, and individually uploads the results; and (3) the ability for the microcontroller to execute some portions of a program from on-chip memory, for example, to patch a program from external ROM by RAM additions or fixes.

DETAILED DESCRIPTION OF THE PREFERRED EMBODIMENTS

Preferred embodiments of the system and method of the present invention are now described with reference to FIGS. 2–4.

Figure 1:
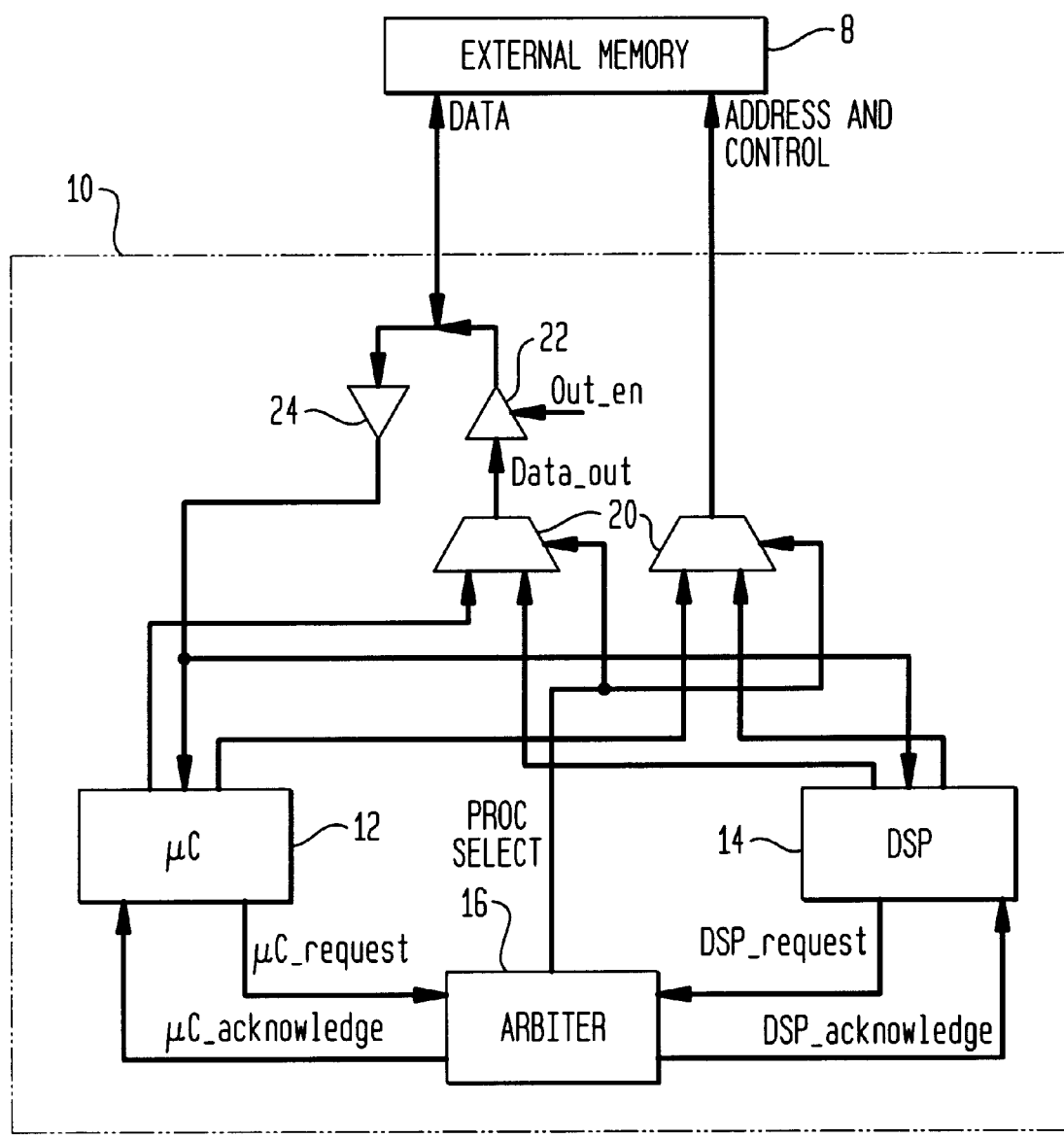
FIG. 1 is a block diagram of a prior art IC chip containing two embedded processors.
Figure 2:
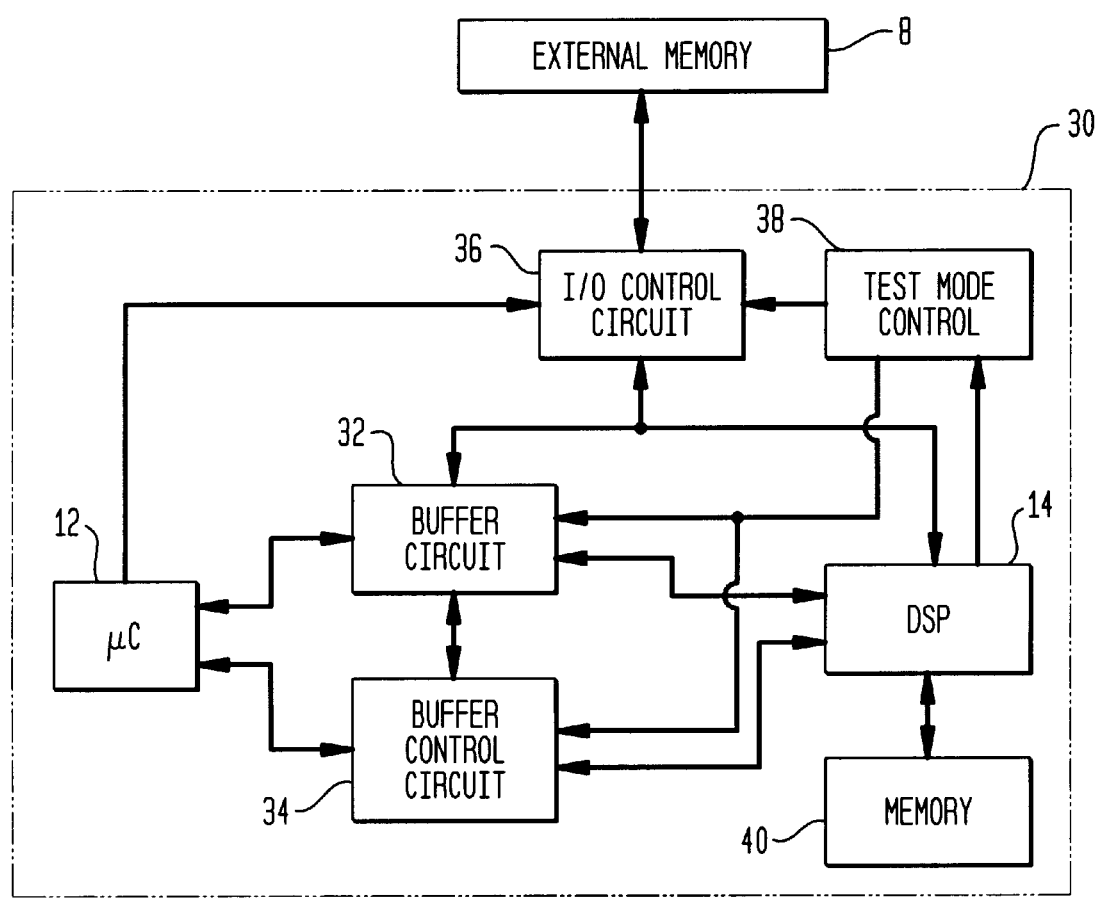
FIG. 2 is a block diagram of an IC chip containing an interlocutor system in accordance with the present invention.

Referring to FIG. 2, an integrated circuit (IC) 30 in accordance with the invention contains a number of elements located on a single chip. The elements on the integrated circuit 30 include a microcontroller 12, digital signal processor (DSP) 14, a buffer circuit 32 coupled between the microprocessor 12 and DSP 14, and a buffer control circuit 34 coupled between the microprocessor 12 and DSP 14 and to the buffer circuit 32. The IC 30 also contains an I/O control circuit 36 for interfacing between the other elements on the IC 30 and an external memory device 8. A test mode control 38 is coupled to and controlled by the DSP and is coupled to and controls the operation of the buffer circuit 32, the buffer control circuit 34, and the I/O control circuit 36. The DSP 14 is further coupled to an on-chip RAM, which is not coupled to the microcontroller 12.

A test program to be run on the microcontroller and a support program to be executed by the DSP 14 during a test is downloaded to the RAM 40 from the external memory 8 through the I/O control circuit 36 and DSP 14. When the support program is read into the DSP 14, the test mode control 38 is set, placing the IC 30 into test mode. The DSP then reads data words from the test program, which may be instructions and/or test program data, and performs a write operation to external memory 8. The write operation is also intercepted and the data word is stored in the buffer circuit 32. The microcontroller 12 can then retrieve the test program data word stored in the buffer circuit 32 and process it. The microcontroller 12 writes the resulting output to the I/O control circuit 36 which in test mode also transfers the microcontroller output to the DSP 14 for checking of the results.

In order to save on IC space, the buffer circuit 32 preferably has limited capacity, and may store as little as one byte or one data word at a time. To help coordinate the data flow through the buffer circuit 32, the buffer control circuit 34 monitors the status of the buffer circuit 32 and enables and disables the microcontroller circuit to retrieve or not retrieve, respectively, data from the buffer circuit 32. The buffer control circuit 34 also controls the DSP 14 to enable or disable the writing of additional data words to the buffer circuit 32 depending upon whether the buffer circuit is less then full or full, respectively.

Preferably, data words are always available in the buffer circuit 32 for transfer to the microcontroller 12 to avoid the need for microcontroller wait states. This is accomplished by providing the buffer circuit with sufficient depth, by providing the DSP 14 with a greater operating frequency than the microcontroller 12, and/or by providing a wide data bus between the DSP 14 and RAM 40 so that the DSP 14 retrieves more data from the RAM 40 than it outputs to the buffer circuit 32 and external memory 8.

When the IC 30 is not in test mode, the test mode control 38 disables the buffer circuit 32 and buffer control circuit 34, and all DSP and microcontroller inputs and outputs are routed by the I/O control circuit to the external memory 8 and other conventional external devices or I/O ports as in a conventional IC.

Figure 3:
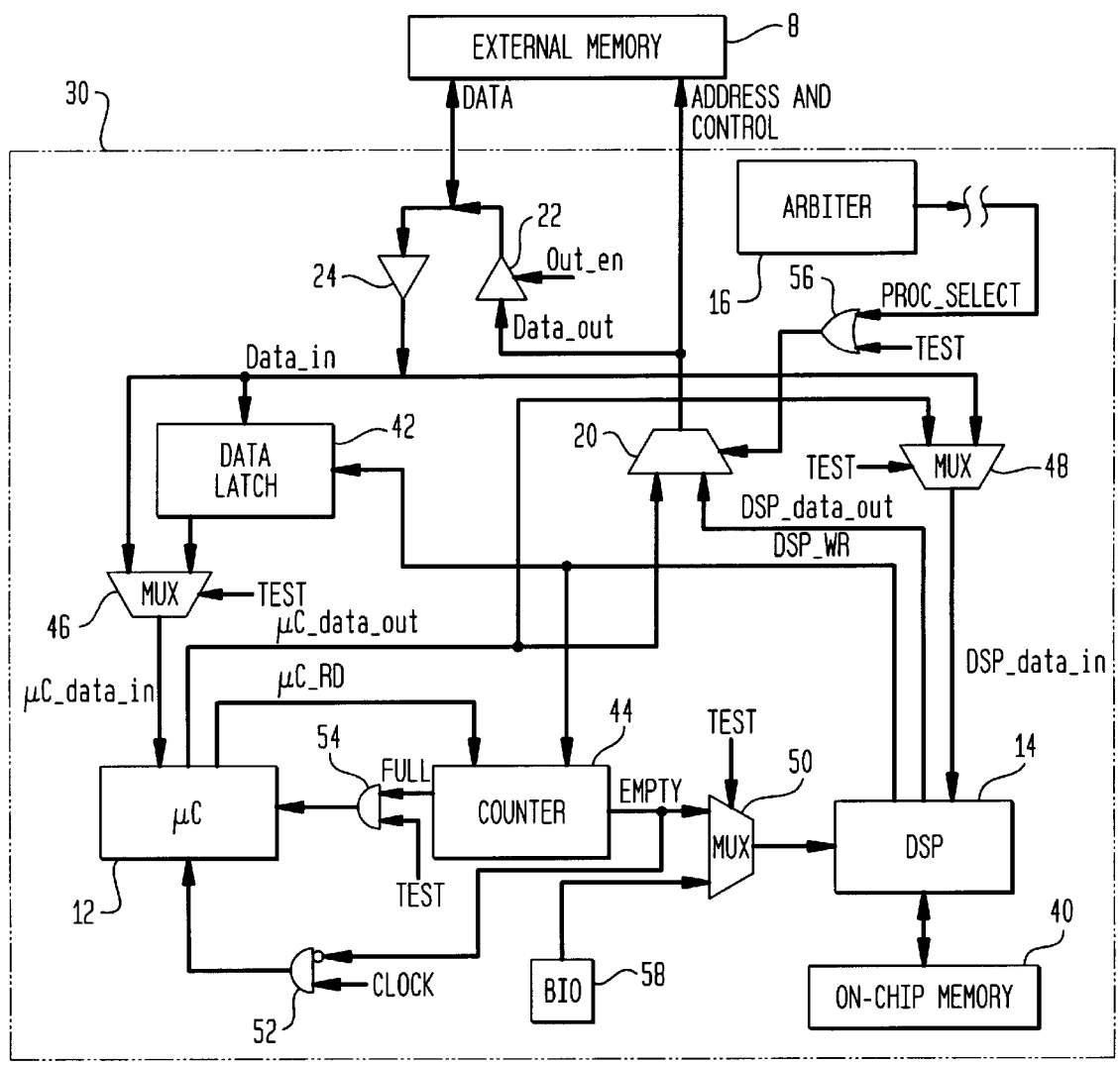
FIG. 3 is a block diagram showing the IC ship of FIG. 3 in greater detail in accordance with a preferred embodiment of the present invention.

A preferred embodiment of the IC 30 is shown in greater detail in FIG. 3. In addition to the microcontroller 12, DSP 14, external interface multiplexer 20, buffer gates 22, 24, and on-chip RAM 40, the IC 30 also contains a data latch 42, a counter 44, several multiplexers 46, 48, 50, and several logic gates or cells 52, 54, and 56.

The test mode for IC 30 is enabled by one of the dedicated chip inputs, e.g., BIO 58, or a spare bit in one register in the DSP 14. In any case it is preferably under DSP control. The interlocutor or test mode is invoked by setting TEST signal high.

The data latch 42 may have a depth of one byte, one 16 bit data word, several data words, or may be even deeper. If the data latch can hold more than one data word, it is organized as a first-in, first out (FIFO) device. As shown in FIG. 3, the data latch 42 is coupled to receive the output of the DSP 14 as well as data received from the external memory 8 through input buffer gate 24. The data latch is coupled to a multiplexer 46 which is in turn coupled to microcontroller 12. The multiplexer 46 also receives the data received from external memory 8, and selects between the data latch 42 signal and the external memory 8 signal to provide input to the microcontroller 12. The test signal being set causes the multiplexer to select the data latch 42 output to transfer to the microcontroller 12.

An additional multiplexer 48 is coupled to receive as inputs data from the external memory 8 data signal and the microcontroller 12 output, and transfers one of these signals to the DSP 14 depending upon the state of the test signal. In test mode, the microcontroller 12 output is transferred to the DSP 14 for result checking.

The counter 44 is an up/down counter corresponding to the depth of the data latch 42 and having an EMPTY flag which is set when the counter 44 is at zero and a FULL flag which is set when the counter is at a maximum value corresponding to a full data latch 42. If the data latch 42 has a one data word capacity, the counter 44 may be a toggle flip-flop which assumes two states-one state, the EMPTY state, when the data latch is empty and capable of receiving a data word from the DSP 14, and another state, the FULL state, when the data latch 42 contains a data word ready to be retrieved by the microprocessor 12. If the data latch 42 has a multi-data word capacity, the counter 44 has a number of bits required for counting the number of data words which may be stored in the data latch 42.

As shown in FIG. 3, the counter 44 is coupled to a write strobe (DSP_WR) output from the DSP 14, which increments the counter to indicate a data word being transferred to the data latch 42, and is also coupled to a read strobe ($\mu C\_RD$) output from the microcontroller 12 which decrements the counter 44 to indicate a data word having been retrieved from the data latch 42.

The EMPTY flag is coupled to a multiplexer 50 which selects under control of the test signal between the EMPTY flag in test mode and the BIO output in non-test mode. The EMPTY flag is also coupled to a logic AND gate 42, which also receives as input a signal from the microcontroller clock. The setting of the EMPTY flag causes the output of AND gate 52 to go low, thus effectively disabling the microcontroller clock. The counter 44 further contains a FULL flag which is output through AND gate 54 along with the test signal to the microcontroller 12 to enable the microcontroller 12 to retrieve a data word from the data latch 42.

When entering the test mode, the up/down counter's EMPTY flag is set to a one, and as a result, when a fetch is attempted, the microcontroller clock will be stopped. After download of on-chip memory (RAM), the DSP 14 will read the first instruction from the on-chip RAM 40 and perform a dummy write to the external memory 8. The external memory interface multiplexer 20 is enabled for the DSP 14 by the TEST signal passed through OR gate 60, which also received as input the processor select signal from an arbiter (not shown). As a result, data from the DSP 14 will be transferred to the output pads including buffer gate 22, and will be repeated on the Data_in bus at the same time. The trailing edge of the DSP write strobe (DSP_WR) will latch the data into the data latch 42 and increment the up/down counter 44. The last will enable microcontroller clock, and the microcontroller will be able to finish a fetch from the data latch register 42.

If the data latch depth is one byte or one word, then until the fetch is performed, the data latch 42 being FULL status is made available to the DSP 14 through one of the BIO's converted from a regular usage by the TEST signal. The DSP 14 polls this BIO 58 and waits until it is set to a zero before performing the next dummy write to the external memory 8. Otherwise, if data latch 42 depth is more than one, the DSP 14 can proceed with dummy writes to the external memory 8, filling up the data latch 42 with the subsequent microcontroller instructions. That allows for a non-interrupted microcontroller flow at the highest possible speed, without the microcontroller clock being stopped. The non-interrupted flow is usually insured either by a higher clock frequency for the DSP 14 than the microcontroller 12 or by a wider data bus between the DSP 14 and on-chip memory 40.

When the microcontroller fetches an instruction, the trailing edge of a read strobe µC_RD decrements the up/down counter 44 setting BIO 58 to an empty condition, if appropriate. If the data latch 42 becomes EMPTY, then the microcontroller clock is stopped awaiting a non-empty condition of the data latch 42 to be restored.

When the microcontroller 12 writes data to the external memory 8, the data is reverted to the DSP 14 by an additional multiplexer 48, so the DSP 14 is able to check the output data against the expected value. For synchronizing purposes, the DSP 14 can use a microcontroller write strobe to memory, which can be connected to one of the BIO 58 or interrupt inputs of the DSP 14.

For a memory patching application, a fast switching mechanism between a regular and test mode may be necessary. In this case a software address or content trap decoder is used to instantaneously switch the device to test mode which will let the DSP 14 provide an alternative set of instructions, terminated by a software driven switch back to a regular mode.

Figure 4:
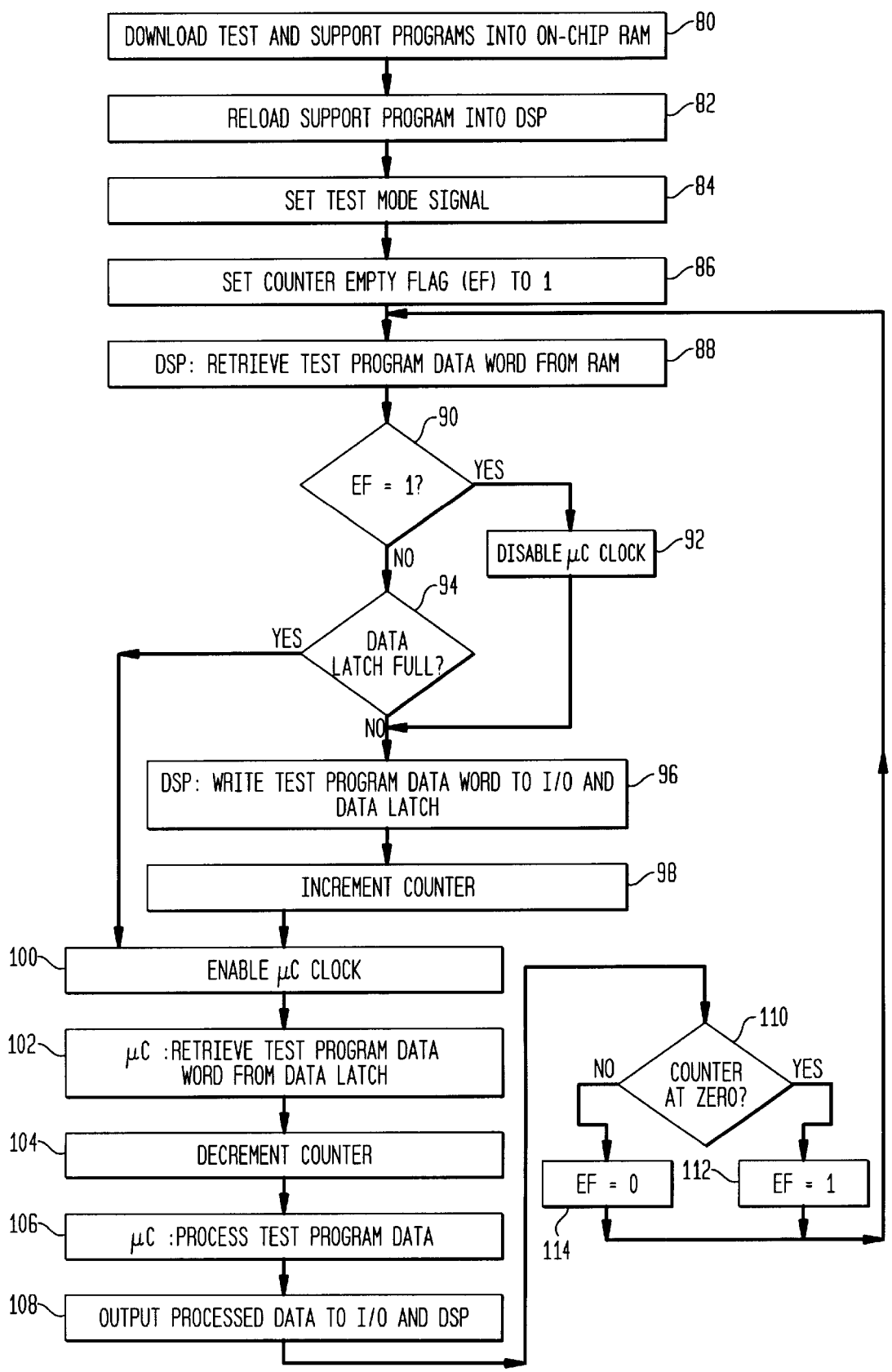
FIG. 4 is a flow chart showing the process of performing at speed testing of a processor core embedded o chip in accordance with a preferred embodiment of the present invention.

A method for using an interlocutor circuit of the type described for testing an embedded microcontroller using an embedded DSP is illustrated in the flow chart of FIG. 4. Those skilled in the art will recognize that the method represented in the flow chart represents one possible sequence of steps in the process, and that the specific steps and their sequence may be altered as design parameters of the system and method of the present invention.

Test and support programs are downloaded to an on-chip RAM from external memory, step 80. The support program is read into the DSP, step 82. The DSP sets the test signal, step 84, to cause the interlocutor circuit to enter into test mode. The EMPTY flag of the counter is set to 1, step 86, to indicate that no test program data has yet been transferred to the data latch. As one skilled in the art will recognize, the EMPTY flag should default to a value of 1 upon system reset. The DSP then retrieves at least one test program data word from on-chip RAM, step 88, and may retrieve more than one data word given a wide bus between the DSP and on-chip RAM.

As each data word is retrieved by the DSP from on-chip RAM, the EMPTY flag being set, step 90, causes the microcontroller clock to be disabled, step 92, so that the microcontroller does not attempt to retrieve data from the data latch. If the EMPTY flag is not set, indicating the presence of data in the data latch, the data latch being fill, step 94, which may be indicated by the FULL flag in the counter being set, prevents the DSP from writing additional test program data from being written to the data latch. If the data latch is only one data word deep, it can only be either empty or full, obviating the need for checking whether the data latch is full.

If the data latch is not full, the DSP writes a test program data word to external memory, which is latched into the data latch, step 96. The counter is incremented, step 98. To retrieve data from the latch, the microcontroller clock is enabled, step 100, and the microcontroller retrieves a data word from the data latch, step 102. The counter is decremented, step 104. The microcontroller processes the test program data, step 106, and outputs the results to the external memory and DSP, step 108. If the counter is at zero, step 110, the EMPTY flag is set, step 112. If the counter is not at zero, the EMPTY flag is unset, step 114. The process continues with the retrieval by the DSP of the next test program data word.

While the invention has been described and illustrated in connection with preferred embodiments, many variations and modifications as will be evident to those skilled in this art may be made without departing from the spirit and scope of the invention. For example, the same method can be applied to providing any on-chip engine, such as a direct memory access chip, associated with external memory, with the stream of data. The invention is thus not to be limited to the precise details of methodology or construction set forth above as such variations and modification are intended to be included within the scope of the invention.

What is claimed is:

1. A system for testing a first processing device located on an integrated circuit using a second processing device located on the integrated circuit, the system comprising:

a first memory device located on the integrated circuit and coupled to the second processing device for storing a test program downloaded from a second memory device external to the integrated circuit;

an interlocutor circuit coupled to the first and second processing devices for allowing the second processing device to control the first processing device to process the test program stored on the first memory device when the system is placed in a test mode and to receive results of the test program processed in the first processing device; and a test mode control circuit for selectively placing the system in the test mode.

2. The system as defined in claim 1, wherein the interlocutor circuit comprises a buffer coupled to the first and second processing devices for receiving test program data retrieved by the second processing device from the first memory device when the system is placed in a test mode and making the test program data available for retrieval by the first processing device.

3. The system as defined in claim 2, wherein the buffer comprises a data latch.

4. The system as defined in claim 3, wherein the data latch has a capacity for storing one data word.

5. The system as defined in claim 3, wherein the data latch has a capacity for storing a plurality of data words.

6. The system of claim 5, wherein the data latch is organized as a FIFO.

7. The system as defined in claim 2, wherein the interlocutor circuit further comprises a control circuit coupled to the first and second processing devices for controlling when the first processing device retrieves test program data from the buffer.

8. The system as defined in claim 7, wherein the control circuit comprises a counter coupled to the first and second processing devices.

9. The system as defined in claim 8, wherein the counter is a toggle flip-flop which assumes a first state when test program data is received in the buffer from the second processing device and assumes a second state when test program data is retrieved by the first processing device.

10. The system of claim 8, wherein the counter has two or more bits and is incremented when test program data is received in the buffer from the second processing device and is decremented when test program data is retrieved by the first processing device.

11. The system as defined in claim 8, wherein the counter is coupled to a clock controlling operation of the first processing circuit such that an empty state of the counter disables the clock and thereby prevents the first processing device from retrieving test program data from the buffer when the system is in the test mode.

12. The system as defined in claim 8, wherein the counter is coupled to the second processing device such that an empty state of the counter enables the second processing device to transfer test program data to the buffer.

13. The system as defined in claim 7, wherein the test mode control circuit comprises a plurality of logic devices for selecting between test mode data and signals and non-text mode data and signals in response to a test mode control signal.

14. The system as defined in claim 13, wherein the test mode control circuit comprises a multiplexer coupled to the buffer and the first processing device for receiving as input the test program data output from the buffer and non-test data received from an external source and for outputting to the first processing device one of the test program or non-test data based upon the test mode control signal.

15. The system as defined in claim 13, wherein the test mode control circuit comprises a multiplexer coupled to the first and second processing devices for receiving as input test result data output from the first processing device and non-test data received from an external source and for outputting to the second processing device one of the test result or non-test data based upon the test mode control signal.

16. The system as defined in claim 13, wherein the test mode control circuit comprises a multiplexer coupled to the control circuit and the second processing device for receiving as input a signal from the control circuit and a second signal and for outputting to the second processing device one of the control circuit or second signals based upon the test mode control signal.

17. The system as defined in claim 1, wherein the first processing device comprises a microcontroller.

18. The system as defined in claim 1, wherein the second processing device comprises a digital signal processor.

19. The system as defined in claim 1, wherein the first and second processing devices are embedded in the integrated circuit.

20. The system as defined in claim 1, wherein the second processing device has a clock frequency higher than a clock frequency of the first processing device.

21. A method for testing a first processing device on an integrated circuit without using a memory device external to the integrated circuit during testing, the integrated circuit further comprising a second processing device and an internal memory device coupled to the second processing device and an external memory storing a test program, the method comprising:

downloading the test program from the external memory device to the internal memory device;

the second processing device retrieving test program data from the internal memory;

buffering the test program data retrieved by the second processing device;

the first processing device retrieving the buffered test program data;

monitoring whether test program data is buffered to thereby control whether test program data retrieved by the second processing device is buffered and whether buffered test program data is retrieved by the first processing device.

22. The method as defined in claim 21, comprising the first processing device processing the test program data to produce results and transmitting the results to the second processing device.

23. A system for testing a first processing device on an integrated circuit without using a memory device external to the integrated circuit, the integrated circuit further comprising a second processing device and an internal memory device coupled to the second processing device and an external memory storing a test program, the system comprising:

means for retrieving test program data from the internal memory downloaded from the external memory device to the second processing device;

buffer means for buffering the test program data retrieved by the second processing device;

means for retrieving the buffered test program data to the first processing device; and control means for monitoring whether test program data is buffered and controlling whether test program data retrieved by the second processing device is buffered in the buffer means and whether buffered test program data in the buffer means is retrieved by the first processing device.

24. A system for patching a software program operating on a first processing device located on an integrated circuit using a second processing device located on the integrated circuit, the system comprising:

a first memory device located on the integrated circuit and coupled to the second processing device for storing a patch program downloaded from a second memory device external to the integrated circuit;

an interlocutor circuit coupled to the first and second processing devices for allowing the second processing device to control the first processing device to process the patch program stored on the first memory device when the system is placed in a first mode; and a switch decoder for selectively switching between the first mode and a second mode in which the processor operates the software program.

* * * * *